(12) United States Patent
Hyndman et al.

(10) Patent No.: US 6,449,643 B1
(45) Date of Patent: Sep. 10, 2002

(54) ACCESS CONTROL WITH JUST-IN-TIME RESOURCE DISCOVERY

(75) Inventors: Arn Close Hyndman, Ottawa; Gordon F. Walls, Kanata, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/078,606

(22) Filed: May 14, 1998

(51) Int. Cl.[7] .............................................. G06F 15/16
(52) U.S. Cl. ........................................ 709/223; 709/226
(58) Field of Search ................................ 709/223, 225, 709/226, 229, 224; 707/103, 104, 9, 10

(56) References Cited

U.S. PATENT DOCUMENTS

| | | | | |
|---|---|---|---|---|
| 5,911,143 A | * | 6/1999 | Deinhart et al. | 707/103 |
| 5,999,978 A | * | 12/1999 | Angal et al. | 709/229 |
| 6,038,563 A | * | 3/2000 | Bapat et al. | 707/10 |
| 6,063,128 A | * | 5/2000 | Bentley et al. | 703/6 |
| 6,064,656 A | * | 5/2000 | Angal et al. | 370/254 |
| 6,085,191 A | * | 7/2000 | Fisher et al. | 707/9 |
| 6,088,451 A | * | 7/2000 | He et al. | 380/28 |

* cited by examiner

Primary Examiner—Ario Etienne
Assistant Examiner—Tod Kupstas
(74) Attorney, Agent, or Firm—Allan P. Millard

(57) ABSTRACT

An access control system for a network manager system provided with a plurality of building blocks (BBs), each specialized for executing a plurality of functions on a plurality of resources of the network, and with a graphical user interface (GUI). Each BB comprises a database for storing access control data pertinent to said component including all resources accessible to the BB, all functions executable by the BB and all users that have the right to use the BB, according to privileges allocated to each user. The BB also comprises an access control library for writing and reading the access control data to and from the database for execution of a network operation according to the respective privileges. The access control system further comprises an access control user interface connected to the access control library of each BB, for viewing and editing the access control data on the GUI.

16 Claims, 10 Drawing Sheets

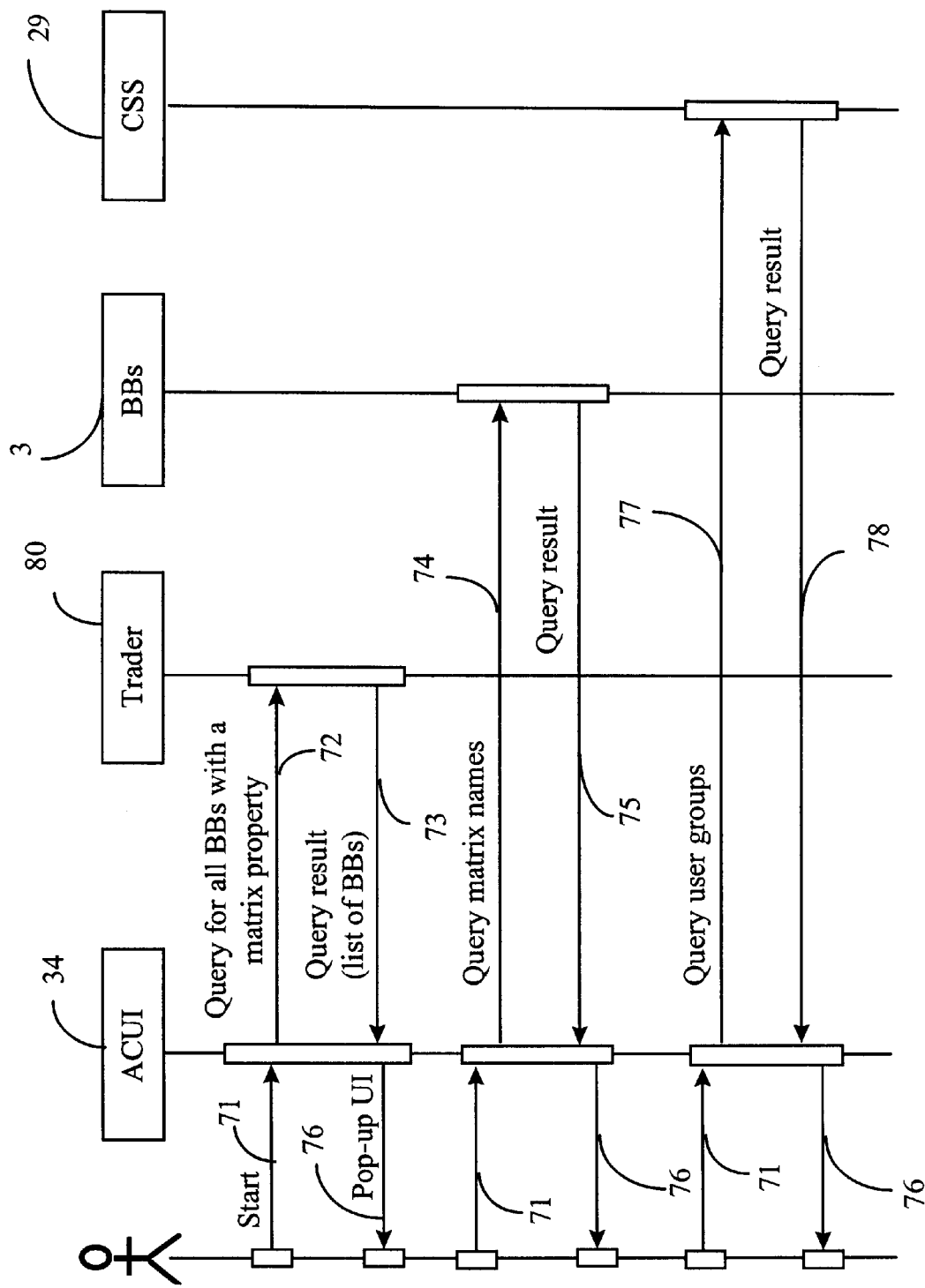

ACCESS CONTROL WITH JUST-IN-TIME RESOURCE DISCOVERY

BACKGROUND OF THE INVENTION

1. Field of the Invention

This invention is directed to a management system for a communication network, and more particularly to an access control system where privileges are assigned to system resources when they are discovered.

2. Background Art

Many of today'intelligent network elements (NEs) have the ability to report their configuration to an external management system either on request or autonomously as changes occur. Intelligent NEs are software driven in every aspect from maintenance to control, to release upgrades.

The management of these NEs requires a robust and highly efficient system which can process a large volume of data over a geographically distributed network. Network management tools typically run on PC or UNIX workstations and enable maintenance, surveillance and administration of the elements that make-up a network. It allows providers to offer faster response times for service configurations and can reduce calls to customers service requests.

As customer transmission networks grow, so does the demand for the number of users who need access to the system. No longer can the entire customer network be managed centrally from a single point, rather the need for distributed network management, locally and geographically, becomes a growing requirement.

Definition of some terms used in this specification are provided next.

A component or an object is an encapsulated part of a software system with a well defined interface. Components serve as the building blocks of a systems, or the elements of a software part list, and can be either generic or application specific. Generic components serve as a system skeleton, enabling code reuse and faster development of new capabilities.

A process is a self-contained package of data and executable procedures which operate on that data, comparable to a task in other known systems. Processes can be used to implement objects, modules or other high-level data abstractions. Objects interact through functions and procedure invocations.

A function is an action that users may take, process or activate in the management system.

A resource is a piece of hardware or a service in the network of interest, managed by the network management system.

User and user groups are the human users of these management systems. Users with similar rights are put together in a user group.

In a distributed multi-process network management product, it is critical to control access to functions and resources. In a traditional system, a user should be limited to specific rights on specific directories of a central computer system. Currently, security access involves access control to a network, multi-platform/distributed user management, and control over anybody in the world to protect specific processes and data on a sensitive distributed system. Obviously, this kind of control is complex and multi-faced.

A network management product provides access to a wide range of resources and performs many different types of functions. Each function may apply to different resources types. In addition, the rules for how users get rights may be very complex. One user may inherit the rights of another or their may be a concept of user groups. It would be unfortunate to require each distributed component to understand all of these complexities for the 'overhead' task of providing access control.

Access control systems typically depend on knowing about all access controllable resources before privileges can be assigned to users/groups. Many current access control systems require knowledge of user rights to be embedded in all distributed components requiring access control. Other access control systems require fixed knowledge of resource and/or function types in a central partitioning engine.

For example, access control in Unix has a fixed set of functions and resources, i.e. read, write, and execute on files, while it does handle providing defaults for new files. Kerberos is an authentication service for open network systems that uses a centralized ticket granting agent, the key distribution center.

However, it is not always possible to know about all resources that require access control initialization. In some systems, it is not possible to query all resources at any time. Nonetheless, these systems can still require access control on a per resource basis.

Rule based systems can provide access control resources in scenarios where all resources are not available. These systems apply rules to resource properties to determine privileges, however these systems do not allow rules to be overridden on a per resource basis and have changes retained, especially after knowledge that the resource was lost. For example, Unix 'forgets' file permissions if a file is destroyed and recreated.

There is a need for providing a security manager with means for controlling the access to the resources of a network where privileges are assigned to system resources dynamically, when they are discovered.

There is also a need for providing a partitioning engine that takes responsibility for managing user rights while still allowing individual distributed components to provide arbitrary resources, resource types and functions, even decided at run-time if desired.

SUMMARY OF THE INVENTION

It is an object of the present invention to provide an access control system for a communication network which alleviates totally or in part the drawbacks of the prior art systems.

It is another object of this invention to provide an access control system where the privileges are assigned to system resources as they are discovered and the access control information gathered gradually over time is retained, ever if knowledge of the resources is lost. This ensures that resources maintain correct privileges.

Still another object of the invention is to provide a generic partitioning engine designed to provide flexible access control features to a distributed application. The generic partitioning engine of this invention provides distributed components with. services that allow the component to efficiently control access to its resources and functions. These generic partitioning services are designed such that each component need not understand the partitioning rules and so that the partitioning engine need not to understand any specifics of the resources or functions.

Yet another object of the invention is to provide a partitioning engine that manages user rights and allows also for individual distributed components to provide arbitrary resources, resource types and functions.

Accordingly, in a network manager system provided with a plurality of components specialized for executing a plurality of functions on a plurality of resources of a network, and with a graphical user interface (GUI), an access control system comprising, at a component of the network manager, a database for storing access control data pertinent to the component including all resources accessible to the component, all functions executable by the component and all users that have the right to use the component, according to a set of privileges for each user, an access control library for writing and reading the access control data to and from the database for execution of a network operation according to the set of privileges on request from a user having the set of privileges, and an access control user interface connected to the access control library for viewing and editing the access control data on the GUI.

Further, in a network manager system provided with a plurality of components specialized for executing a plurality of functions on a plurality of resources of a network, and with a graphical user interface (GUI), a method for controlling access of a user comprising the steps of storing, in a database of a component of the network manager, access control data pertinent to the component including all resources accessible to the component, all functions executable by the component and all users that have the right to use the component, accessing the database with an access control library for using the access control data for execution by a user of a network operation according to a set of privileges on accorded to the user, viewing the access control data on the GUI using an access control user interface connected to the access control library, and editing the access control using the access control user interface.

Use of the present invention will allow network and service providers to design a flexible and low administration access control system for products that may not have knowledge of all access controllable resources at any time. This is particularly valuable for network management systems with high distributed resource knowledge.

The access control system (ACS) of the present invention has at least the following advantages over the prior systems:

The ACS can discover resources gradually over time. As resources are discovered, rules are applied to determine 'initial' privileges. The ACS allows initial privileges to be overridden at the granularity of a single resource, and retained. This control is not dependent on current knowledge of the resources in the system at large.

The ACS retains knowledge of resources in order to maintain configured privileges even when the system at large does not retain this knowledge.

The partitioning engine according to the invention, handles storing rules for user rights, i.e. user groups, inheritance of rights, etc. The partitioning engine stores three-dimensional matrices of users, functions, and resources, each matrix containing only functions that could apply to the resource in that matrix. A distributed component advertises its functions and resources into a particular matrix in the partitioning engine. A component requiring access control requests user rights against the functions and resources they support from the partitioning engine.

The partitioning engine is distributed and maintains a separation of concerns from the rest of the distributed components. In this way, a distributed application may extend rapidly, without requiring additional work to manage user rights for each new component that provides access to new functions or resources. It also provides centralized administration, resulting in a cheaper and cleaner way to manage access control.

BRIEF DESCRIPTION OF THE DRAWINGS

The foregoing and other objects, features and advantages of the invention will be apparent from the following more particular description of the preferred embodiments, as illustrated in the appended drawings, where:

FIG. 7 is a flow-chart showing ACUI initialization interactions;

DESCRIPTION OF THE PREFERRED EMBODIMENT

In the following, a general description of a network management system to which the present invention is applicable is provided for further defining the terminology used in this specification.

Figure 1:
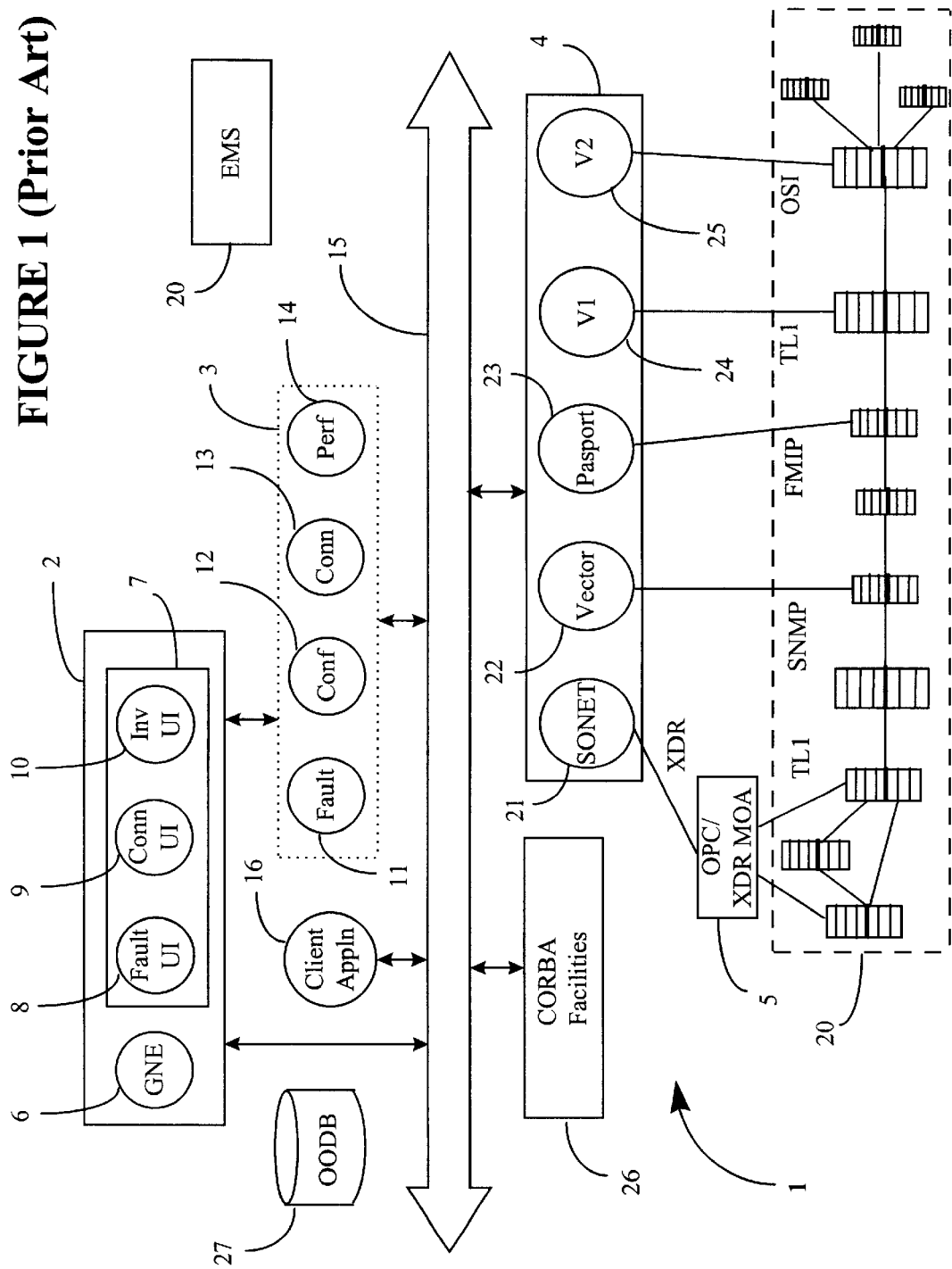
FIG. 1 is a block diagram of an integrated network manager (INM) (prior art)

The Applicant'integrated network manager (INM) broadband product is an open, multi-technology and multi-vendor distributed element management system. An exemplary block diagram of the INM is shown in FIG. 1, but it is to be understood that the invention applies to other distributed network management architectures, and that it does not apply exclusively to telecommunication networks.

INM broadband 1 is based on common object request broker architecture (CORBA) technology, and comprises three components: a graphical user interface (GUI) 2, application building blocks (BB) 3 and element controllers, which could be managed object agents (MOA) 4 or operation controllers (OPC) 5.

GUI 2 comprises two graphical user interfaces, namely a graphical network editor (GNE) 6, and a graphical network browser (GNB) 7 which delivers functions such as surveillance, connection provisioning, software delivery, inventory and performance monitoring. FIG. 1 shows a fault user interface (UI) 8, a connection UI 9, and an inventory UI 10, each performing the function indicated by their respective name.

The application BBs 3 are software components providing functionality to the GUI through open, standards-based CORBA interface 15.

A BB server is a piece of software that provides services, and a BB client is a piece of software which makes use of the facilities (services) provided by a BB server.

The BBs of the Nortel'INM broadband include for example: fault management BB 11, configuration management BB 12, connectivity management BB 13 and performance management BB 14. Reference numeral 16 shows a client designed BB, which could be added to the INM for a specific application.

MOAs 4 are network element management software entities that consolidate and adapt information from the network under their control. MOAs 4 are provided for various technologies, so as to communicate with the managed network using TL1, OSI (Open System Interconnect), CMIP (Common Management Information Protocol), SNMP (Simple Network Management Protocol) or XDR (External Data Representation) proprietary protocols. MOAs 4 are CORBA-based, which facilitates development of INM-compatible MOAs by third parties.

SONET MOA 21 provides adaptation and mediation between a SONET subnetwork and the BBs 3. It represents equipment, such as for example the OC-3 express, Titan, DV45, etc., via OPC 5. Vector MOA 22 and Passport MOA 23 provide mediation between the ATM network and the INM BBs 3. MOAs 24 to 25 are vendor MOAs in this example, and interface the INM BBs 3 using proprietary interfaces to the NE or subnetwork controllers.

MOAs 4 manage network 20, or subnetworks, network elements (NE), links, and shelf based equipment. Bellcore, ISO (International Standards Organization) and OSI standards specify a set of generic states network objects forming part of a communication network may assume. The intent of the generic states is to allow network objects which are compliant with these standards to be maintainable by non-vendor specific network management tools. While the standards provide textual definition to the states, the graphical representation of the permutation and combination of states is left to the network management tool developers. There is also considerable 'value add' functionality in network equipment that is not covered by standards, which is desirable to manage.

The object request broker interface, generically shown at 15, is used as a distributed computing infrastructure to create applications that readily interact within the CORBA (Common Object Request Broker Architecture) environment, with minimal technology dependencies. Block 26 shows generically services that may be provided by CORBA, such as event, life cycle, transaction, concurrency control, security services, etc.

INM broadband 1 employs the philosophy 'the network is the database', and can make use of current technology to obtain an accurate, up-to-date view of the configurations of all the network elements it controls. An object-oriented database 27 is however introduced in the INM architecture for persistent storage of network level objects which cannot be derived from, or stored in the network.

Finally, an element management system (EMS) 20 manages applications and the platforms on which they run. EMS 20 comprises four types of management disciplines: availability, deployment, application management and security management.

Applicant'customer network management (CNM) builds into the INM BB infrastructure, adding new BBs and user interfaces to the INM product illustrated in FIG. 1. Among the upgrades, CNM provides web-based physical network display and fault management facilities, service display and fault management facilities, lightweight and multiplatform user interface, security and access control at both the user interface and machine interfaces, custom commands and URL linking facilities to be used for advertising, service requests, report delivery, etc. The CNM architecture is also designed to support next generation of networks and network management systems.

Figure 2A:
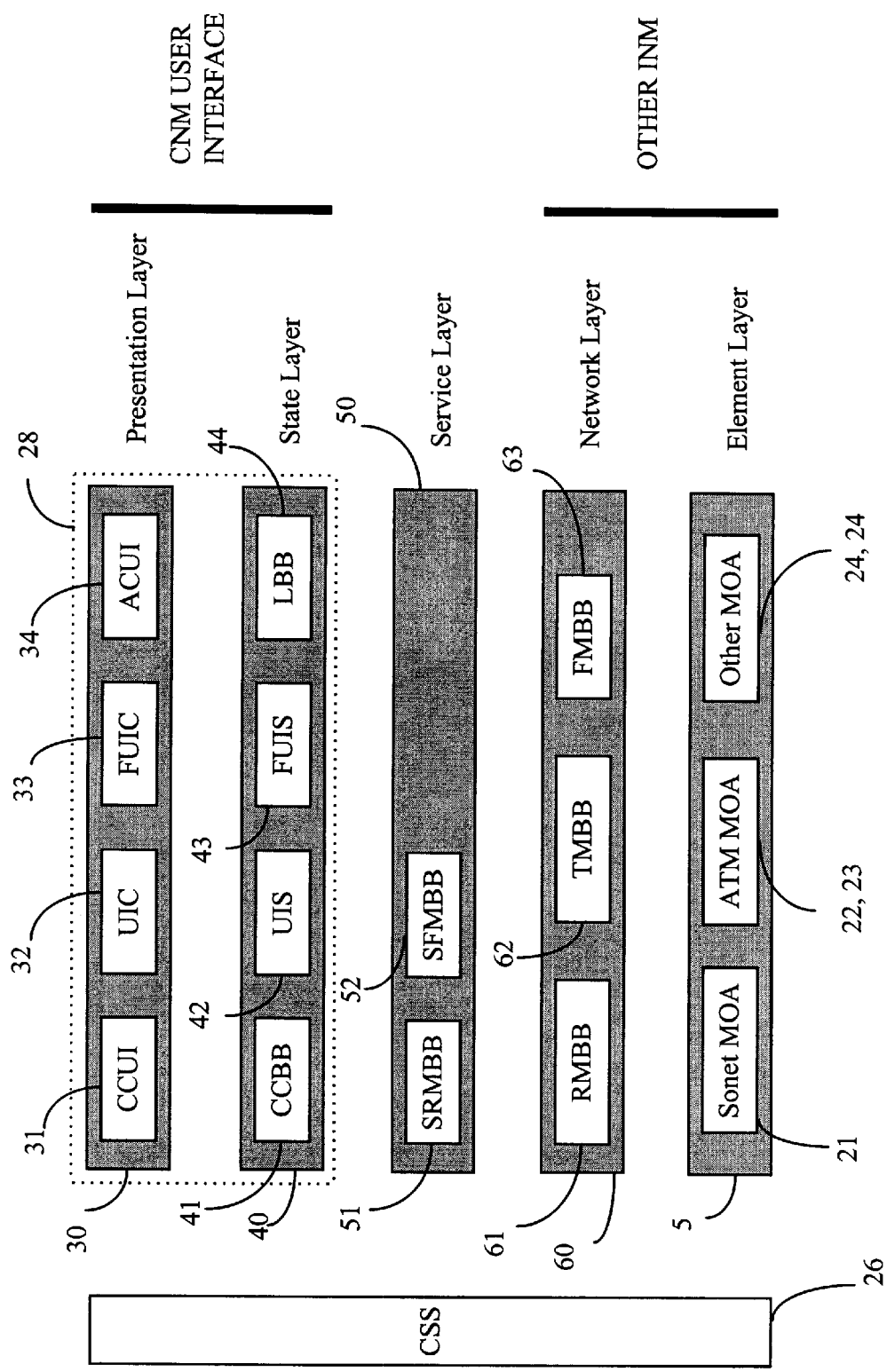
FIG. 2A shows the logical layered architecture of the customer network management (CNM) architecture.

FIG. 2A shows a layered view of the CNM architecture, also illustrating the access control interfaces according to this invention. CNM architecture is based on the telecommunications management network (TMN) layered model of network management, including an element layer 5, a network layer 60, a service layer 50 and a user interface 28. The CNM user interface 28 employs facilities provided by both service and network layers, as it is capable of displaying information at both levels of abstraction.

The user interface is decomposed into two layers. State layer 40 maintains state information and is composed of a collection of processes which interact with the BBs. Presentation layer 30 uses the services of the state layer 40 and is responsible for presentation of data and direct user interaction. CSS (CORBA Security System) 29 is a library used by every user of the interface and every BB.

Table 1 below gives the name and responsibility of each component shown in FIG. 2A.

TABLE 1

High level components of CNM

| Name | # | Function | Tech |
|---|---|---|---|
| CCUI<br>Custom Command UI | 31 | User configuration of custom commands | Java |
| UIC<br>Service & Network Management UI Client | 32 | Presentation of network data and general interaction with the user | Java |
| FUIC<br>Fault UI Client | 33 | User interface for fault details | Java |
| ACUI<br>Access Control UI | 34 | User configuration of access control | Java<br>C++ |
| CCBB<br>Custom Command BB | 41 | Custom command management | Java |
| UIS<br>Service & Network Management UI Server | 42 | UI state storage and logic to support UIC | Java |
| FUIS<br>Fault UI Server | 43 | State and data management for FUIC | Java |
| LBB<br>Layout BB | 44 | Management of network resource & layout information | Java |
| SRMBB<br>Service Resource Management BB | 51 | Service resource management | C++ |
| SFMBB<br>Service Fault Management BB | 52 | Service fault management | C++ |
| RMBB<br>Resource Mgmt BB | 61 | Resource management | C++ |
| TMBB<br>Trail Management BB | 62 | Trail management | C++ |
| FMBB<br>Fault Management BB | 63 | Fault management | C++ |
| CSS<br>CORBA Security Sys. | 29 | Authentication, Encryption & Transport of auth. data | |

Figure 2B:
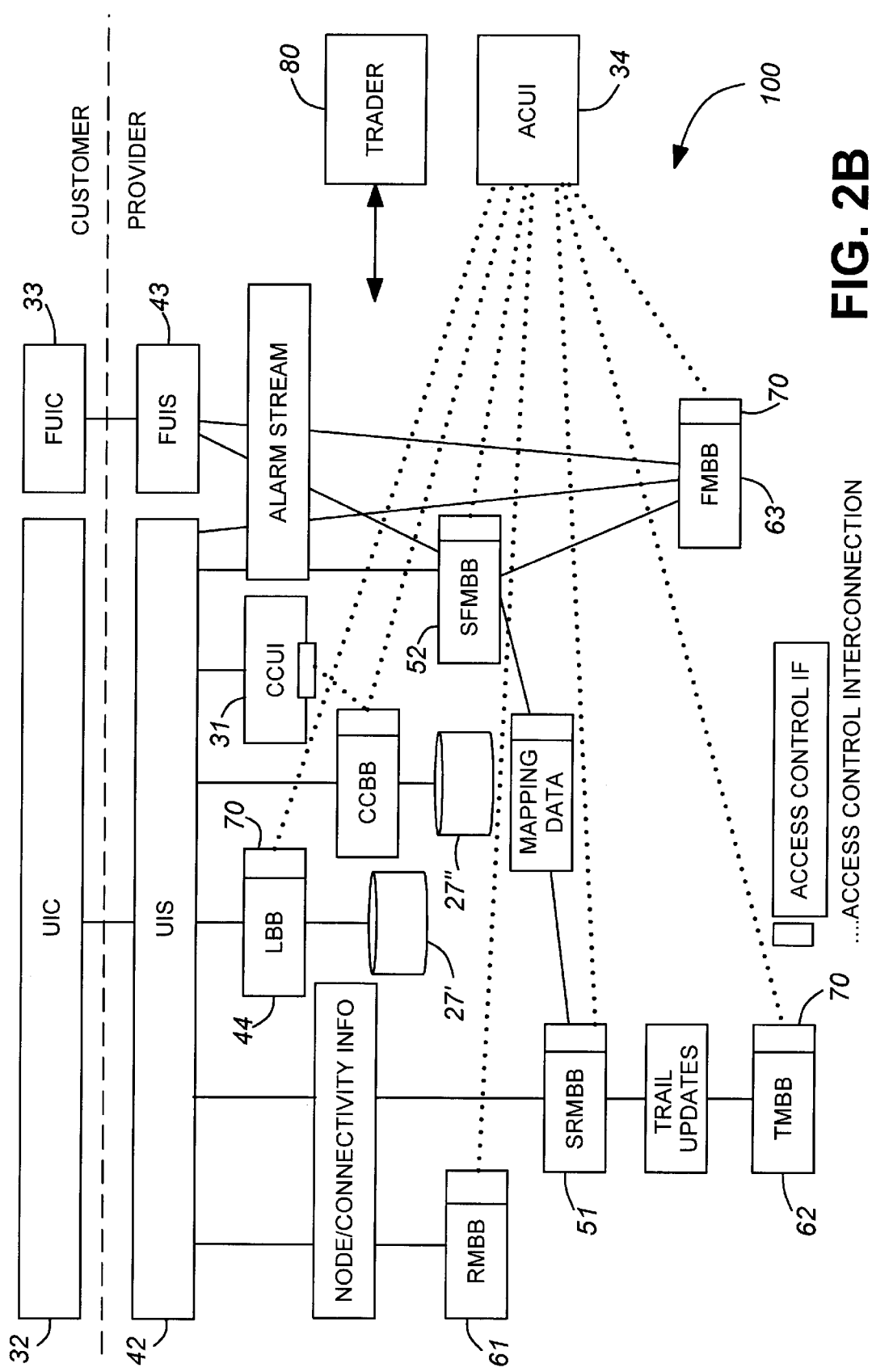
FIG. 2B is a block diagram of CNM, illustrating the access control feature of this invention.

FIG. 2B is a block diagram of the CNM 100, illustrating the main communication processes, including the ACUI process 34. Access control database, CORBA security services (CSS) 29 and AMBB (application management BB) are not shown here for clarity. The interconnections between the access control interface ACUI 34 and other components of the CNM are shown in dotted lines, and are implemented using keyed CORBA protocols. The grey blocks illustrate the type of data flowing between the respective components.

As shown in FIG. 2B, each access controlled BB is responsible for managing the access control related to the resources and functions it provides. This is illustrated by a generalized control interface 70 shown in black at the respective access controlled BB and indicating the access control feature according to the invention. This access control feature allows the administrator of the network to limit what users can see and can do.

Each BB supports a set of generalized access control interfaces, and provides persistent storage for access control information, as shown and described in connection with FIG. 4. As a result, each BB can operate independently of any centralized access control system; access control data is stored close to where it is needed and can be integrated into BB specific database structures where it makes sense to do so.

Incorporating the access control into each BB provides several benefits over alternative solutions.

Firstly, the BB clients can be simplified. In many cases BB clients need not understand access control to provide an access controlled feature. For example a client can request all available NE information from RMBB (resource management BB) 61, and will only receive data for those NEs the user has privileges to see.

Scalability of the network is enhanced. Access control data and computation are distributed across BBs, allowing division of labour. In addition, data filtering is performed at the BB to enforce access control, reducing the amount of messaging to clients.

Furthermore, CORBA interfaces can be used for the network manager without them being aware of access control, which is a significant simplification to the interfaces. Access control is enforced on the machine interface, so providers can sell partitioned data streams to their customers.

Figure 3:
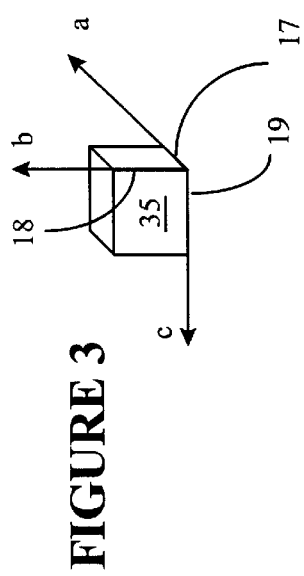
FIG. 3 illustrates the concept of access control matrices according to the invention.

The access control data is stored and maintained using AC matrices distributed throughout the system. An AC matrix is a named three dimensional matrix of bits representing access control information. FIG. 3 illustrates an access control matrix 35. The axes of the matrix are functions (axis a), resources (axis b) and user groups (axis c). Matrix 35 is described by functions 17, resources 18 and users/groups 19. The function and resource dimensions 17 and 18 are specified locally by each BB, but the user group dimension is controlled by the ACUI 34 and CORBA Security System (CSS) 29. Each BB may maintain zero or more matrices, but usually one.

A user represents a single user of the system, usually a person. Users are grouped together into user groups which represent commonality in access control, i.e. users do not have access control, user groups do. Groups are organized into trees which represent scope of influence. For example, user AB can belong to CD-West group, which can belong to CD group, which can belong to the root group (the provider). Passwords are assigned on a per-user basis. Users can be added, moved, and removed from the system without changing AC.

A resource in the example of the telecommunication network 100 of FIG. 2B is a resource that requires access control. An example of resources are the NEs, or the layouts.

A function in the example of the telecommunication network 100 of FIG. 2B is a dimension of an AC matrix representing an access controlled function in the system. Functions could be for example alarm reporting, performance monitoring, etc.

A matrix slice is a piece of an access control matrix. An example of a slice is the list of resources that are permitted given a user group and a function. During runtime, matrix slices are used by each BB to control on which resources users can perform functions. These matrix slices are also used by UIs to update menus when access privileges change.

The AC system according to the invention is designed to be generic. Matrices, resources and functions are specified by each BB in a prescribed manner. AC components need not understand how each matrix is used or what kinds of resources and functions exist; they treat all matrices, all resources and all functions in the same way.

Matrices and functions are identified to ACUI user by name. User groups also have names and some string properties. Resources have names and some string properties intended to assist the user in searching throughout or filtering large numbers of resources.

The potential size of AC matrices affects how data is managed within the AC system. For example, CNM 100 allows a maximum size of each axis of 5,000 for users (1,000 active at once), 2,000 for user groups (800 active at once); 10 for functions and 10,000 for resources. These results in a matrix size of 200,000,000 bits (24 MB$^{1718}$). This data is too large to hold in a memory, so the matrices are stored using sparse matrix techniques, especially when cached in the memory, or data is maintained in persistent storage until needed.

There are situations where two or more BBs share the maintenance of a single AC matrix. This happens when multiple BBs are interested in the same resources but in different functions. An example is the RMBB 61 and the FMBB 63 which both deal with NE as resources, but have different functions.

This type of AC matrix used by more than a BB is called multiple-BB matrix. Each BB maintains its own part in the AC matrix, called a partial matrix. When the user deals with the matrix in the ACUI, the entire matrix is presented as a single entity. To do this, ACUI 34 creates combined resource and function lists for the UI.

A complete matrix contains all functions for a particular resource type. Partial matrices contain a subset of all the functions for a particular resource type. Combining all partial matrices gives a complete matrix.

ACUI 34 is responsible for providing an efficient way to view and edit the access control data supplied by the BBs and the CSS 29. The access control data is also represented at ACUI 34 in matrices, such as matrix 35 of FIG. 3, where resources, functions, and user groups are its dimensions.

ACUI 34 is also responsible for synchronizing resources lists in partial matrices. It is quite possible that the resource lists in partial matrices are different, even if they are interested in same resources. For example, RMBB 61 recognizes an NE when it is first enrolled, but the FMBB 63 will not recognize that NE until it has an alarm, which is likely to occur much later. This difference is not a problem, until the AC matrix is changed by the ACUI. During edits, partial matrices must all have the same resources. To facilitate this, the ACUI sends the combined resource list that it constructs to all BBs containing a partial matrix. The partial matrices will then expand as required using defaults. This is done whenever the user requests to edit a multiple-BB matrix, and it will be explained in detail later in connection with FIG. 10.

Trader 80 is also show n in FIG. 2B. While all BBs and all interfaces 70 communicate with trader 80, these connections were not illustrated for not overloading this figure.

Table 2 lists some of the matrices, and the corresponding resources and functions in the CNM.

TABLE 2

CNM Matrices

| BB | Matrix Name | Type | Resources | Functions |
| --- | --- | --- | --- | --- |
| RMBB | Physical Nodes | Multiple | NE | View; Remote inv. Login; Shelf level graphics |
| FMBB | Physical Nodes | Multiple | Services | Alarm Counts Alarm Details Alarm Ackn |
| SRMBB | Logical Nodes | Multiple | Services | View |
| SFMBB | Logical Nodes | Multiple | Services | Alarm Counts Alarm Details Alarm Ackn |
| LBB | Layouts | Single | Layouts | View Edit Copy |
| CCBB | Commands | Single | Command sets | View |
| TMBB | Trails | Single | Trails | |

Functions as Alarm acknowledgement, Remote inventory, Login; Shelf level graphics functions are implemented assuming support in the respective BB. Due to the number of resources in TMBB, it supports multiple single-BB matrices, each of which controls trails from a particular layer.

In order to support access control, the AC interface shown at 70 in FIG. 2B, comprises two generalized access control interfaces, namely a read interface 55 and an administration interface 56. FIG. 4 illustrates a block diagram of a server BB, generically referred to as 3A, and a client 3B, also showing how the components of a BB communicate. An example of the client to access controlled BB relationship is the FUIS 43 to FMBB 63 relationship (see FIG. 28).

BB 3A comprises a BB core 53 for implementing the functionality of the respective BB, a database (DB) access component 54, a database 57, and two access interfaces 55 and 56. Blocks 54 to 56 form the AC library component 58.

AC library 58 is a collection of software components which can be bound to a BB in order to quickly implement AC functionality. Use of the library is not required to create an access controlled BB, but will considerably reduce the effort required to do so.

DB access component 54 is a component which manages persistent storage in DB 57, and caching of access control information.

Read interface 55 allows clients, such as client 3B, to get a list of AC matrices the BB maintains, get the functions the BB provides to each matrix, get a list of which resources the client has the right to use a particular function on, and register for notification of changes to the client'privileges.

Administration interface 56 is a keyed CORBA interface that only allows a single ACUI to connect to the respective BB. It allows ACUI 34 to get the list of resources for each matrix used by the BB, get a slice of a matrix given two dimensions, get an individual entry given three dimensions, set a slice or individual entry of a matrix, do bulk update resource list for multiple BB matrices, and notify the BB of a deleted user or user group.

Any of these components can be replaced by the BB developer where is desirable to do so. In the case of TMBB 62, for example, the data base access component 54 could be replaced with core TMBB code in order to allow access control information to be stored within the existing trail management database schemas.

Communication between DB access component 54, BB core 53 and interfaces 55 and 56 takes place as shown by the arrows referred to by letters A–F, a–h and 1–4, and detailed next.

Matrix creation. At the time when a BB is first started, BB core 53 asks the database access component 54 to create the matrices it needs with the functions and resources it supports, as shown by arrow A.

Resources. BB core 53 can add or remove a resource whenever it becomes aware of the resource. This is shown by arrow B.

When a new resource is added, the new slice will be initialized by copying a special slice that represents the 'default resource'. This slice is configurable by the provider in ACUI 34 and gives the provider complete control over what users may have access to what functions on a new resource.

As an option, core BB 53 can specify that a new resource should be initialized from the access control of another resource. This is useful in copy operations and the simulation of hierarchical access control.

Deletion of a resource does very little, as access control will reuse old permission if the resource comes back. BB core 53 can 'forget' about a resource if that is the nature of the respective BB, since the database access component 54 will maintain resources that were added in the past.

Functions. BB core 53 can also adds new functions, as shown by arrow C. When a new function is added, default values are calculated from the rest of the matrix. New functions would only occur during an upgrade scenario where an existing BB is upgraded to support a new function.

User Group Connection Data. BB core 53 provides notification (arrow D) when a user group connects or disconnects from the BB, to allow the database access component 54 to perform caching.

User privileges. Queries are lodged by both BB core 53 (arrow E) and read interface 55 (arrow 1) on demand from BB client 3B (arrow G) to DB access component 54, to determine if a user has sufficient privileges to perform a function on a resource.

Privilege queries are low cost. The database access component 54 uses techniques such as caching and hash tables to ensure 0(1) performance. BB core 53 and read interface 55 also registers for changes to user privileges using an observer pattern. This allows events to be generated for BB clients when resources are added or removed from a user'privileges.

DB access component 54 notifies the BB core 53 and the read interface 55 implementation of the user privileges, as shown by arrows F and 2, respectively. User privilege notifications also go into the core BB 53 and read interface 55 when permissions change. In some cases, notifications into the core BB will trigger the BB to simulate events (like enrol or de-enrol) so that clients of the BB see the effects of the permission change.

Matrix queries by clients. Read interface 55 makes straightforward queries for matrix data (arrows G and 3), on request from a client.

Matrix information to clients. In response to the matrix queries, DB access component 54 returns to the client BB, over read interface 55 a list of AC matrices that BB 3A maintains, and the list of functions the BB provides to each matrix. Also, read interface 55 gets a list of resources on which BB client 3B has the right to use a particular function, arrows G and 4.

Read interface 55 allows ACUI 34 to view and modify (edit) access control data, as shown by arrows H and a.

Add/delete users/user groups. ACUI 34 may request addition/deletion of users/groups add users and user groups, over read interface 55, shown by arrows H and b.

When a new group is added, the new matrix slice will not allow any function on any resources. A side benefit of this approach is that all matrices in the system do not require an expansion, or even a change. Only when a matrix is subsequently edited and the new user given permission, does that matrix change. As a side note, when new users are added, they immediately get the permissions of their parent group.

Defaults, ACUI 34 configure access control defaults through read interface (arrows H and c), whenever a new matrix is created, or a resource is added to the system.

Matrix query by ACUI. ACUI 34 requests matrix queries from DB access 54 over the administration interface 56, as shown by arrows I and d.

In response to the matrix queries by ACUI 34, administration interface 56 receives the list of resources for each matrix used by the BB, a slice of a matrix given two dimensions, or an individual entry given three dimensions, as shown by arrows I and e.

Matrix changes. On instruction from ACUI 34, administration interface 56 informs the database access component 54 of matrix changes, shown by arrow f, including permissions changes. Interface 56 also notifies BB core 53 of a deleted user or user group (arrows I and g).

Updates. For multiple BB matrices only, administration interface 56 bulk-updates the resource list and transmits it to the ACUI, and performs resource list synchronization on instruction from ACUI, shown by arrows I and h.

Figure 4:
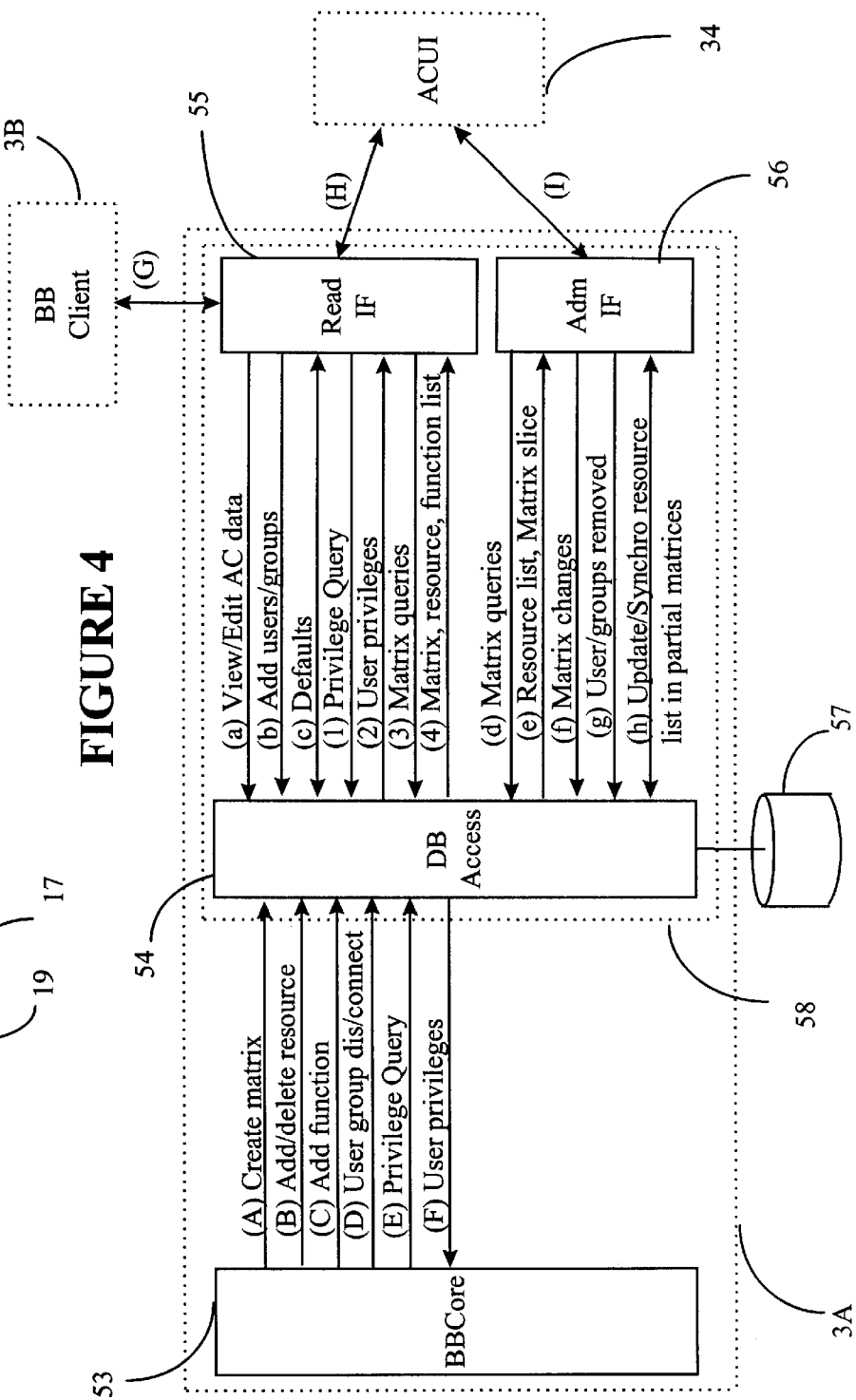
FIG. 4 shows the AC interfaces according to the invention.
Figures 5A, 5B:
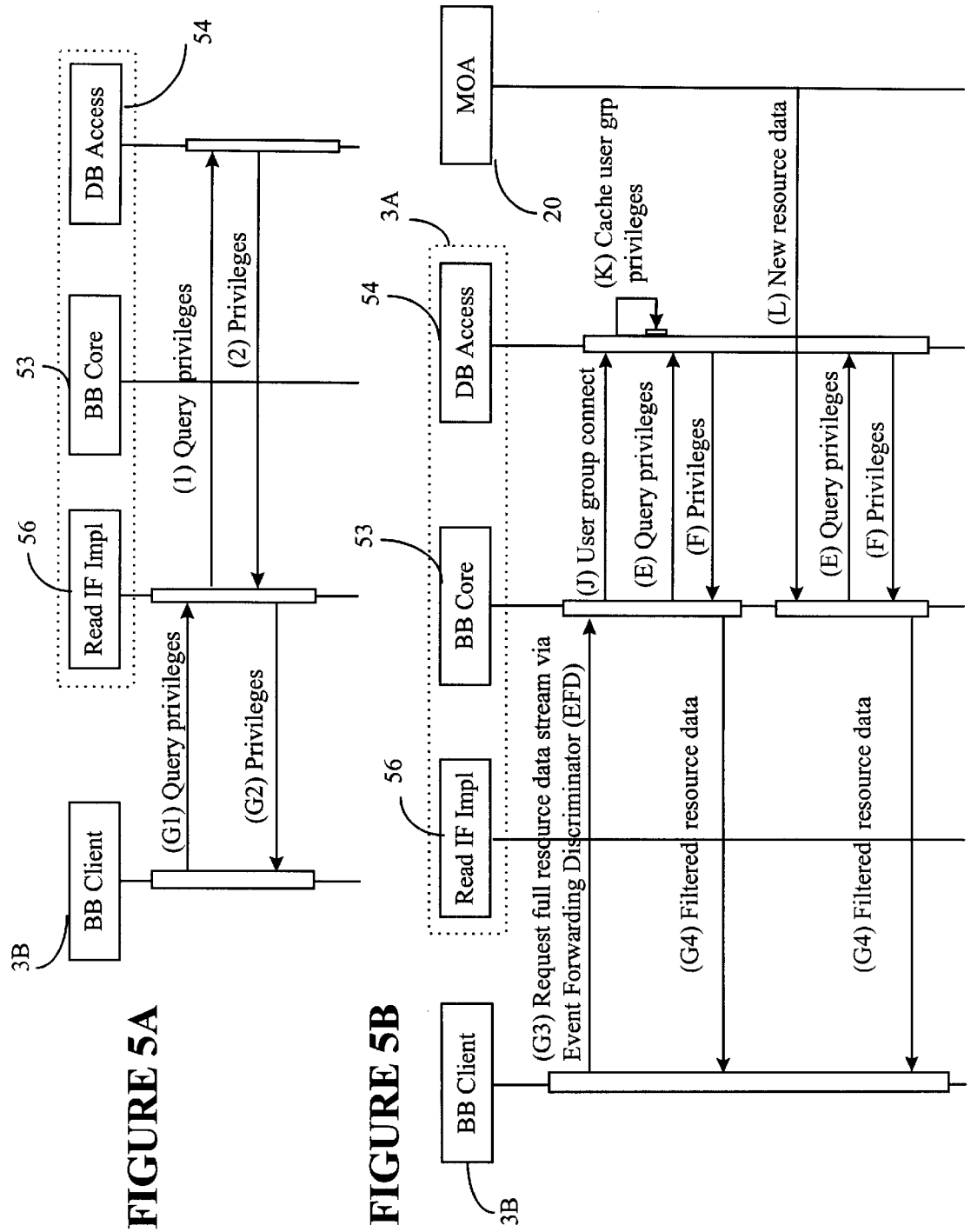
FIG. 5A is a flow-chart of how AC components respond to a BB client query to determine its access privileges.
FIG. 5B is a flow-chart of how the BB core interacts with the AC components to enforce privileges an a regular BB operation.

FIG. 5A is a flow chart showing how the access control components respond when a BB client queries to determine its access privileges, in other words the actions relating to arrows G, 1 and 2 in FIG. 4.

Whenever BB client 3B requests information on its privileges, arrow G1, the query is forwarded by the read interface 55, arrow 1, to DB access component 54. DB access component 54 accesses DB 57 and returns the privileges information to BB 3B over read interface 55, shown by arrows 2 and G2.

FIG. 5B shows how the BB core 53 interacts with the access control components to enforce user privileges on a regular BB operation. Whenever BB client 3B requests access to a resource (full resource information) as shown by arrow G3, BB core 53 determines the user group the client belongs to and provides it to the DB access 54 (arrow J), which in turn retrieves the user group privileges, shown by arrow K. BB core 53 then queries DB access component 54 to determine the privileges for that particular BB client, shown by arrow E, and the privileges are returned to BB core 53, shown by arrow F. BB core 53 then filters from the list with all privileges the resource data and forwards them to BB client 3B, as requested, arrow G4.

When a MOA 20 is connected to the system for first time, new resource data are provided to BB core 53, i.e. MOA 20 registers with BB core 53, as shown by arrow P. BB core 53 then queries DB access component 53 on the privileges of this new MOA set for the group to which the MOA belongs to, shown by arrow E. DB access 54 returns the list of privileges to BB core 53 (arrow F), and BB core 53 filters the resource data with all privileges. The filtered resource data is then provided to the client BB, shown by arrow G4.

Figure 6A:
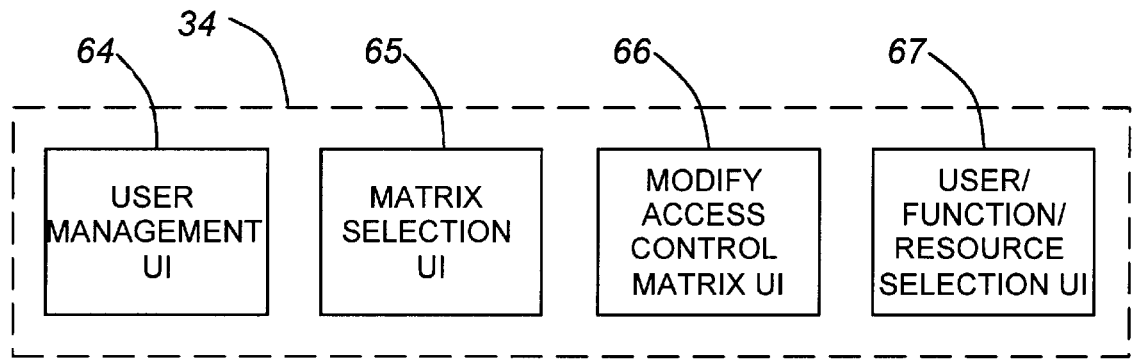
FIG. 6A is a block diagram of the access control user interface; (ACUI)
Figure 6B:
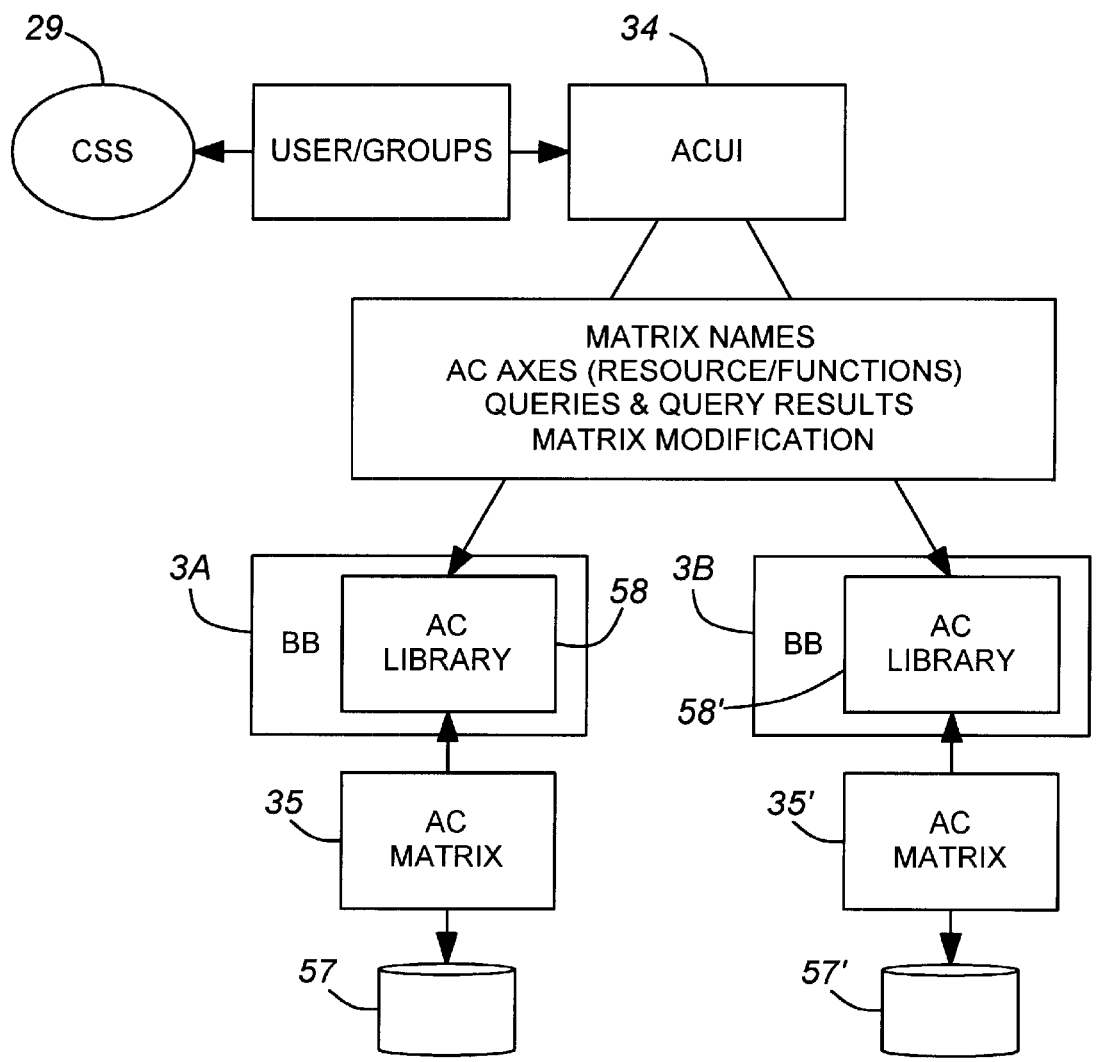
FIG. 6B is a block diagram showing the data flow between the ACUI and the AC library.

A block diagram of ACUI 34 is shown in FIG. 6A, while FIG. 6B shows in the grey boxes the type of data flowing in and out of the ACUI also shown in FIG. 4 by arrows (H) and (J).

The components are a user management (UMUI) 64, a matrix selection (MSUI) 65, a modify access control matrix (MACUI) 66, and a user/function/resource selection (UFRSUI) 67.

UMUI 64 is used for adding and removing users and user groups to the CORBA Security Service (CSS), as shown in FIG. 6B. This interface may be custom designed.

MSUI 65 is used to select a matrix using the matrix name.

MACMUI 66 is an interface used to modify selected access control matrices. Each axis of the selected matrix is displayed and permissions for users to perform functions on resources are set using this UI.

UFRSUI 67 allows the user to search/sort and select an item from each axis of the matrices using their properties. For example, the resource selection UI might display the resource axis with its properties such as the NE name, ID, type, shelf type, etc., assuming the NE is a resource in this matrix. Using these properties, resources can be searched and sorted.

FIG. 7 shows the initialization sequence for the ACUI. ACUI 34 is invoked when there is a need to edit access control data. On initialization by user as shown in step 71, it connects to the CORBA security system (CSS) 29 and query the CORBA trader service 80 for all registered matrices, step 72. In response to the query, the list of BBs 3 with matrices is displayed by MSUI 65.

In the case where the trader 80 doesn't support queries on properties, the matrix names can be retrieved from the BBs, as shown in steps 74 and 75. In this case, BBs 3 return the query result to ACUI 34, which pops-up MSUI 65, shown in step 76. For queries on users/groups, ACUI 34 contacts CSS 26 as shown in steps 77, 78.

Figure 8A:
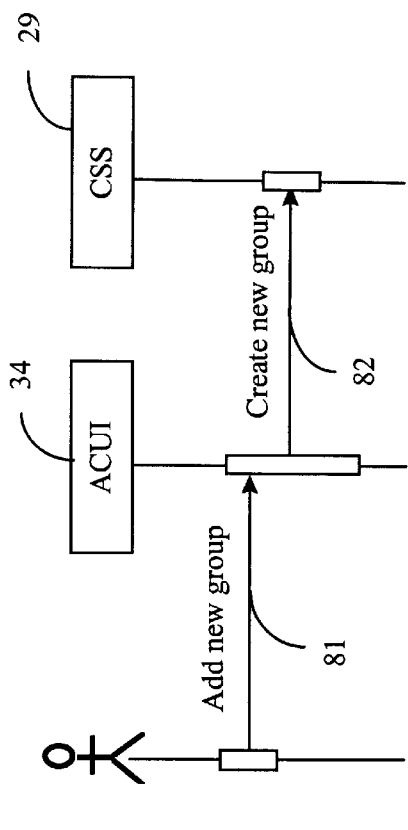
FIG. 8A is flow-chart showing how new users are added.
Figure 8B:
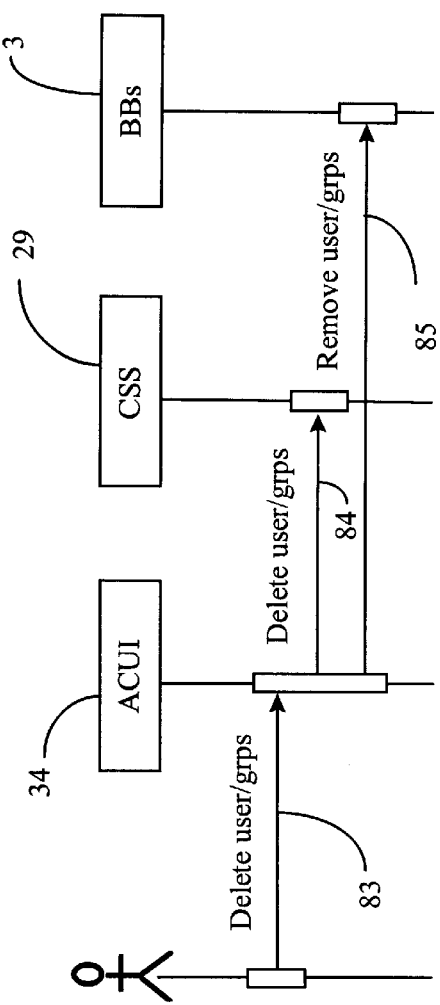
FIG. 8B is flow-chart showing how users are deleted.

FIGS. 8A and 8B illustrate creation and respectively deletion of user/groups to the CSS 29, and thus to the system. No BB is invoked or needs to be informed when new groups/users are added, since initially users have no permissions. FIG. 8A shows ACUI 34 being presented to the user. The user adds the new group, step 81, and ACUI 34 creates the new group for CSS 26. A third party associated with the user management system may also be used.

When a user group is removed, step 83, CSS deletes the user/group, step 84, and all BBs are also informed of the user/group removal, as illustrated in step 85. Only empty groups can be removed. Although there is no access control operation to be performed, it will be the BB'responsibility to sever any current connections to the BB by that layer. The CSS will then prevent re-access.

The AC library will then remove all permissions for that user group. This has no effect on the core BB, since all the users should be 'kicked-out' by this point.

Figure 9:
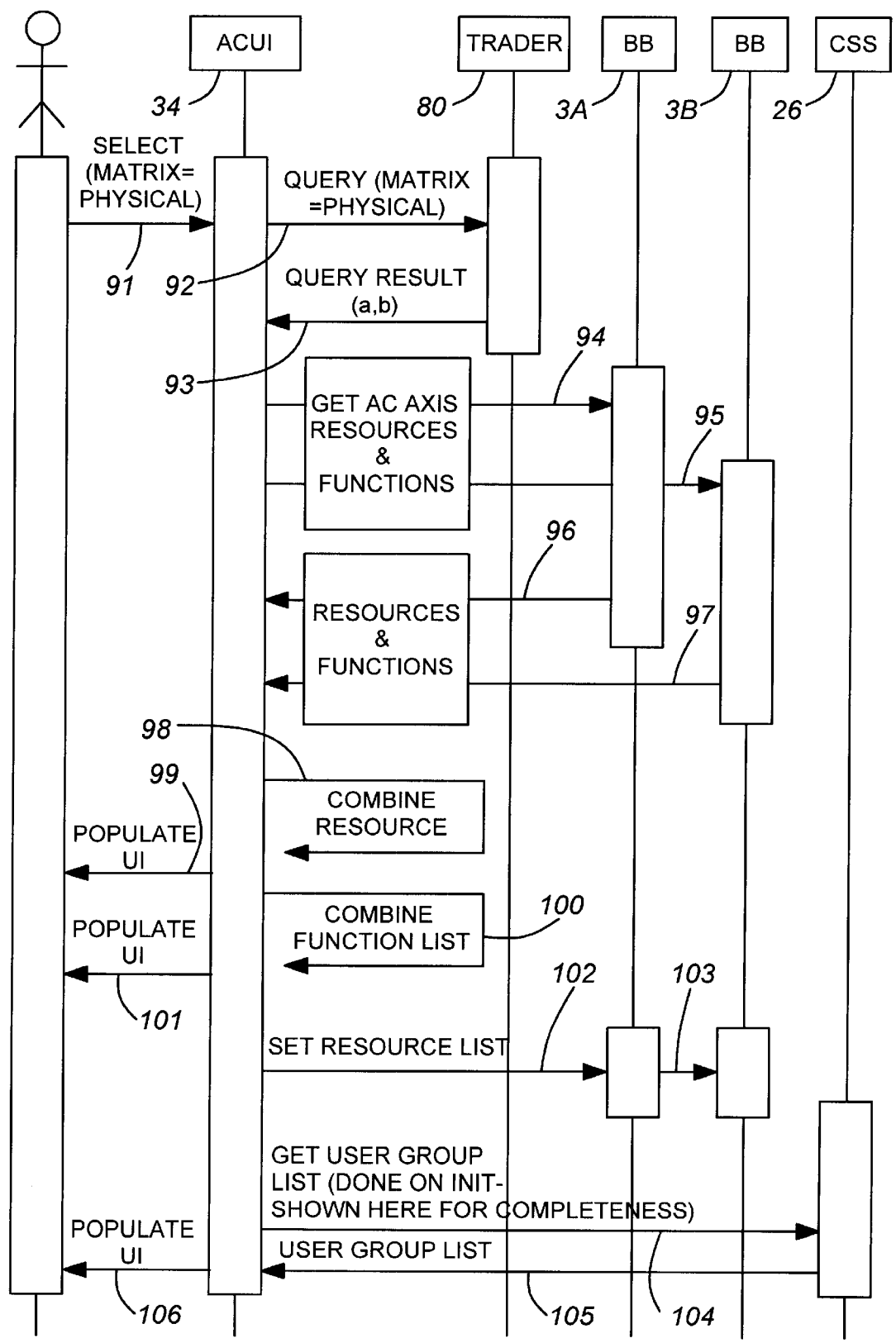
FIG. 9 is flow-chart showing multiple-BB matrix selection and population of modify AC matrix UI.

FIG. 9 illustrates how a multiple-BB matrix is selected and populated. The single BB matrix scenario is a simplification of this one, where there is only one BB and no resource synchronization is performed. As shown in this figure, after the user selects the multiple BB matrix for a physical node of interest, in step 91, ACUI 34 queries trader 80 to establish connection to the BBs that contain the partial matrices of that multiple-BB matrix, step 92. Query results are the resource (a) and function (b) axes, received by the ACUI 34 in step 93.

Then the resource and function axes are requested from the BBs 3A and 3B in steps 94 and 95, and collected in steps 96 and 97. Each list is combined to provide the user of the ACUI with a single list view. Thus, the resources are combined as shown at 98 and the modify access matrix is populated with this data in step 99. Similarly, the matrix is populated with the function list in steps 100 and 101 and the BBs are also notified of the combined list in steps 102 and 103. The user group list was retrieved from the CSS on initialization (see FIG. 7), but is also illustrated on this figure as steps 104 to 106 for completeness.

Figure 10:
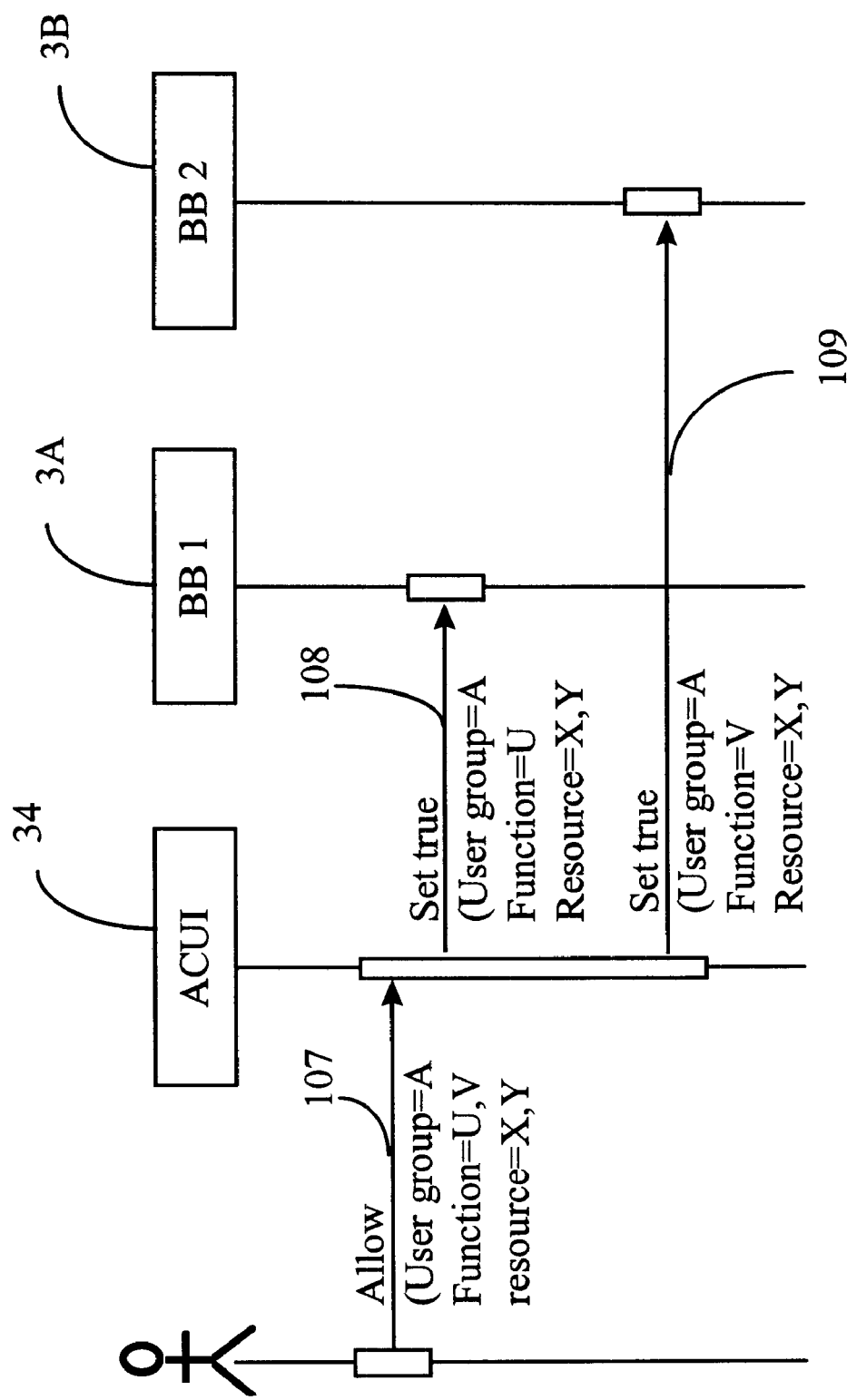
FIG. 10 is flow-chart showing how user permissions are set-up.

FIG. 10 shows how user permissions are set using the multiple-BB matrix scenario of FIG. 9. After similar operations as shown above, the resource, functions and user group list is displayed in the MACMUI (Modify Access Control Matrix UI) 65. The ACUI user selects user A from the user list, functions U and V from the function list, and resources X and Y from the resources list, step 107, and requests to allow user A to perform function U on resources X and Y, step 108. Similarly, ACUI 34 requests to allow user A to perform function V on resources X and Y, step 109. Note that the function U belongs to the BB 1 and function V belongs to BB 2.

We claim:

1. In a network management system based on common object request broker technology and comprising a graphical user interface (GUI), a plurality of application building blocks (BBs) communicating with said GUI, and element controllers communicating with said BBs, an access control system integral to said network management system comprising:

an access control user interface (ACUI); and at each of a plurality of access control building blocks, each of which communicates with said ACUI:

a database for storing access control data pertinent to said access control building block including all resources accessible to said access control building block, all functions executable by said access control building block and all users that have the right to use said access control building block, according to a set of privileges for each user; and an access control library for writing and reading said access control data to and from said database for execution of a network operation according to said Set of privileges on request from a user having said set of privileges, wherein said plurality of access control building blocks are distributed throughout a network controlled by said network management system;

and wherein each of said plurality of access control building blocks is independently responsible for managing the access control related to its respective resources and functions;

and wherein said access control data is stored in said database in the form of a matrix having resource data, function data and user data as dimensions;

and wherein when a new resource or function is added to a selected one said plurality of access control building blocks, a matrix slice configurable by the ACUI and representing a default resource or function, is used to establish initial access control.

2. An access control system as claimed in claim 1, wherein initial access control for a new resource or function added to a selected one said plurality of access control building blocks, is optionally provided using the access control data of an existing resource or function associated with said selected one of said plurality of access control building blocks.

3. An access control system as claimed in claim 1, wherein said access control library comprises:

a read interface for providing client access data from said database to a client component and for providing said access control data to said access control user interface for viewing and editing;

an administration interface for updating said access control data in said database on instruction from said access control user interface; and a data base access for accessing said database and providing said access control data to said client component and said access control data to said access control user interface, and for updating said access control data in said database with information on current resources and current functions available to said client component.

4. An access control system as claimed in claim 1, wherein said access control user interface comprises:

a user management interface for selecting said matrix using a matrix name;

a matrix selection user interface for adding and removing users and user groups to and from said matrix;

a modify access control user interface for modifying said matrix in conformity with an updated set of privileges; and a user, function and resource selection interface for searching and sorting one of a function, a resource, and a user, according to a respective selected property.

5. In a network management system based on common object request broker technology and comprising a graphical user interface (GUI), a plurality of application building blocks (BBs) communicating with said GUI, and element controllers communicating with said BBs, a method of controlling access of a user comprising the steps of:

at each of a plurality of access control building blocks, each of which communicates with an access control user interface (ACUI):

storing, in a database integral to said access control building block, access control data pertinent to said access control building block including all resources accessible to said access control building block, all functions executable by said access control building block and all users that have the right to use said access control building block;

accessing said database with an access control library integral to said access control building block for using said access control data for execution by a user of resources and functions associated with said access control building block according to a set of privileges accorded to said user;

viewing said access control data associated with a selected access control building block on said ACUI, said ACUI connected to said access control library; and editing said access control using said ACUI;

wherein said plurality of access control building blocks are distributed throughout a network controlled by said network management system;

and wherein each of said plurality of access control building blocks is independently responsible for managing the access control related to its respective resources and functions;

and wherein said, access control data is stored in said database in the form of a matrix having resource data, function data and user data as dimensions;

and wherein when a new resource is added to a selected one said plurality of access control building blocks, a matrix slice configurable by the ACUI and representing a default resource is used to establish initial access control.

6. A method as claimed in claim 5, wherein the step of accessing comprises:

providing at said access control building block a read interface connected to said database, and to said access control user interface;

providing at said access control building block an administration interface connected to said database and said access control user interface;

transferring said access control data from said database to said access control user interface; and transferring edited access control data from said access control user interface to said database.

7. A method as claimed in claim 6, wherein the step of editing comprises, on instruction from said access control user interface:

removing a user in said matrix by said administration interface;

adding a user by said read interface; and editing said function, resource and user data in said matrix by said administration interface.

8. A method as claimed in claim 5, wherein said network management system further comprises a client component, and wherein said step of accessing comprises:

providing at said access control building block a read interface connected to said database, to said client component, and to said access control user interface;

providing at said access control building block an administration interface connected to said database and said access control user interface;

transferring said access control data from said database to said access control user interface;

transferring edited access control data from said access control user interface to said database; and providing client data selected from said access control data from said database to said client component through said read interface, on request from said client component.

9. A method as claimed in claim 5, wherein initial access control for a new resource or function added to a selected one of said plurality of access control building blocks, is optionally provided using the access control data of an existing resource or function associated with said selected one said plurality of access control building blocks.

10. A method as claimed in claim 5, wherein said matrix is a multiple matrix shared by a plurality of access control building blocks which use same resources but perform different functions.

11. A method as claimed in claim 5, wherein said multiple matrix is distributed between said plurality of access control building blocks, a partial matrix at each of said access control building blocks, and said access control user interface performs synchronization of resources in all said partial matrices.

12. A method as claimed in claim 5, wherein said user is a singular user or a group of users having same privileges in operating the network.

13. A method as claimed in claim 5, wherein at least one client component is associated with each of the plurality of access control building block, and wherein whenever the number of client components for an access control building block is higher than a threshold the method further comprises, duplicating said access control building block and said access control library of said access control building block to obtain an original access control building block and a duplicate access control building block;

connecting a part of said client components to said original access control building block and connecting the remainder of said client components to said duplicate access control building block; and connecting said access control library of said duplicate access control building block with said access control user interface.

14. A method as claimed in claim 5, wherein said step of storing said access control data in said database comprises:

providing in a designated area of said database default values for said resource data, function data and user data of said matrix, by said access control user interface through said read interface;

assigning a name to said matrix;

updating said default values with data on current resources and current functions available to said access control building block, provided by said access control building block; and updating said default values with data on current users and user groups, and the corresponding privileges, with said access control user interface.

15. A method as claimed in claim 5, further comprising the steps of assigning a name to each user, user group and resource.

16. A method as claimed in claim 5, wherein said network manager system comprises a component which is a client of said access control building block, and wherein the method further comprises the steps of:

receiving at said access control library of said access building block, from said client component, a first inquiry about said set of privileges, and providing said client component with said set of privileges; and receiving at said access control library of said access control building block, from said client component, a second inquiry about said matrix, and providing said client component only with access control data from said matrix that is pertinent to said client component.

* * * * *